UNITED STATES PATENT OFFICE 2,400,465

CATALYTIC CONVERSION OF HYDROCARBONS

Milton M. Marisic, Woodbury, N. J., assignor to Socony-Vacuum Oil Company, Incorporated, a corporation of New York No Drawing. Application December 1, 1943, Serial No. 512,487

2 Claims. (Cl. 196—52)

This invention relates to compositions of matter having catalytic properties in dry form. Specifically, the invention relates to plural oxide gels containing a major proportion of silica and a minor proportion of zirconia useful as catalytic agents for conversion of hydrocarbons.

Plural oxide compositions closely related to those of the present invention have been known for many purposes, including catalytic conversion reactions wherein the plural oxide acts as a catalyst or as an adsorptive support for a catalytic substance. Similar materials have also been suggested as zeolitic base-exchange agents for purification of water and the like. In general, the previously known materials have fallen into two groups. True gels have been prepared by forming gelable sols at high acidity and permitting the sols to gel, thus forming firm hydrogels which are subsequently broken up into relatively small fragments, washed and dried. High acidity gels consisting of hydrated silica can be handled in this manner fairly readily and, if desired, other oxides may be combined therewith by impregnation. For the most part, joint gelation of silica and a metal oxide at high acidity involves difficulty in that the subsequent washing step removes large proportions of the metal oxide. Means have been described for overcoming this difficulty but the compositions so obtained have been found to be poor catalysts for hydrocarbon conversion reactions.

The other type of composition known to the prior art is a joint precipitate formed under such conditions that a large proportion of the oxides separated from the reactant solutions are precipitated as slimy gelatinous portions during the course of mixing the reactant solutions. Where precipitates are formed, it is possible to conduct the process in such manner that a portion of the separated oxides is in the form of a hydrogel embracing the precipitate and giving the whole a firm body closely resembling that of a true hydrogel. This latter type of composition has been generally referred to in the art as a "gel" but is readily distinguishable from a gel containing no precipitate since the latter is translucent while occlusion of precipitate gives a grainy opaque appearance.

In my prior copending application Serial No. 461,455, filed October 9, 1942, of which this application is a continuation-in-part, there are disclosed processes for preparing pellets of true gels containing substantially no precipitate and having hard surfaces after drying. In its broader aspects, the process contemplates formation of a gelable sol at pH 2.5 to 10, preferably pH 5 to 8.5, separating the sol into a plurality of relatively small portions and permitting separate gelation of the several portions.

As a further condition to be met in the formation of gels having hard surfaces, the concentration of reactants must be such that the gel is not formed immediately. There must be a substantial time lapse between formation of the reactant solution and setting to a gel. The elapsed time to be provided for gel formation is determined by the means of forming the pellets or other shape in which the gel is to be used. According to a preferred process described in my said application, the reactant solution is divided into portions corresponding in volume to that of the desired final forms, taking into account the shrinkage normally incident to syneresis and drying, and these portions are maintained separate, as by immersion in oil, until gelation takes place. Preferred methods of accomplishing that result are described in my copending application noted above and the specification thereof is referred to for detailed discussions. Another method that might be mentioned is to place drops of the reactant solution on a surface not wetted by water, which may be moving for continuous operation. Thus, drops of the solution may be placed in a flat wax surface or a wax-coated surface having depressions of a size correlated to that of the desired pellets. Whatever method of forming is employed, the solution will be made up in such manner that gelation will occur after separation of the solution into portions as outlined above and/or described in my copending application.

Vigorous agitation while mixing the ingredients of the solution to be gelled is essential. Unless the solutions added together to obtain the gelable solution are rapidly and efficiently mixed, precipitation will occur, giving a softer product which cannot be handled in the preferred manner. If the solution is stirred efficiently during mixing, there will be no precipitation when the gelation time is substantial. The two solutions used to form the gelable sol may be flowed together and mixed in a flowing stream or the silicate may be added to the acid. Mixing by addition of acid to silicate normally results in precipitation.

For the purposes of more detailed discussion, a particular class of gels having high cracking efficiency will be considered. Those gels which comprise a major proportion of silica and a minor proportion of zirconia, with or without additional metal oxides, are highly active cracking catalysts. While it is within the contemplation of the invention to form a silica gel and impregnate the finished gel with a metal salt, the preferred practice involves conjoint gelation to obtain a homogeneous catalyst. To a substantial extent, suitable additional metals are those of amphoteric nature. These introduce a complicating factor in pH control. I have found that account must be taken of the amphoteric metal as though it takes up alkali metals to form alkali metallates such as sodium aluminate. Further, these metals are often added as cations of water-soluble salts and the anions of those salts also take up alkali metal. Thus, the amount of acid required to produce the desired pH on mixing water glass, zirconium sulfate, aluminum sulfate and acid, can be estimated simply by calculating the quantity of acid which will neutralize the residual $Na_2O$ content of the water glass after subtracting that amount of $Na_2O$ which will form sodium aluminate and sodium sulfate from all the alumina and sulfate present. I have found that control of gelation time may be easily achieved in spite of the fact that it may not be concisely expressed in general terms. Gelation time, at constant pH, is increased by dilution of the solution and by reduction in temperature. An increase in temperature of 10° C. may decrease the gelation time as much as 75%. It will be readily seen that, if slower gelation is desired, the solution may be diluted, the temperature lowered, or both.

Additional generalizations may be stated. As the pH of the reactant (gelling) solution is lowered beyond the limits expressed above, the activity of the gel as a cracking catalyst decreases substantially.

The dried gels of this invention may be tempered, in the manner known in the art, by treatment with steam. The effect of steam is to reduce the drastic action of the catalyst tending to decompose the charging stock to coke and gas. In many cases, comparable results are obtained by washing the undried gel with hot water or treating the undried hydrogel with steam during the processing operation.

Other objects and advantages of the invention will be apparent from the following detailed description of the invention in connection with silica-zirconia gels.

A silica-zirconia gel is prepared by adding a sodium silicate solution of the proper concentration to an efficiently stirred solution containing an acid and the desired quantity of a zirconium salt. The concentration of acid is such that after the liquids have been mixed to form a colloidal solution the pH of the solution is from 2.5 to 10; preferably, between pH 5 and 8.5. The concentrations of the salts in the two solutions before mixing are adjusted so that when the liquids are mixed with efficient stirring no precipitation, nor coagulation occurs; but after the solutions have been thoroughly mixed, the whole volume of the liquid sets to a gel in a few seconds, a few minutes or longer, but preferably in less than thirty minutes. The gel thus formed will be referred to hereafter as the hydrogel.

It is proper to point out here that the silica-zirconia hydrogel prepared as described above, possesses a homogeneous structure and a uniform composition, hence, it is unlike the gelatinous precipitate of silica-zirconia as obtained by methods previously used. When silica-zirconia is precipitated by adding a sodium silicate solution to a solution containing a zirconium salt and an acid, the composition and the structure of the material precipitating is constantly changing as it is coming out of the solution.

The silica-zirconia hydrogel prepared as described above may be processed by any one of the following procedures to prepare the finished catalyst. Generally, the hydrogel was not processed until syneresis of the gel was complete.

1. The hydrogel is broken into particles of predetermined size and washed with water until free of soluble salts. The hydrogel at this point is not pure silica-zirconia, but contains zeolitic sodium ions which are replaceable by other positive ions; hence, the hydrogel is washed with an ammonium salt, such as ammonium chloride, to replace the sodium ions by ammonium ions. The hydrogel is washed with ammonium chloride solution several times in order to insure substantially complete replacement of the sodium ions by ammonium ions. The hydrogel is finally washed with water several times to remove any excess of ammonium chloride that may be adsorbed on the gel. The washed hydrogel may be cast into molds so as to form pellets of any size or shape and then dried slowly at 180° to 250° F. with or without the aid of a current of air; or, the washed hydrogel may be dried under the conditions just given and then broken into particles of any desired size. The gel is further dried at about 1000° F. At this temperature the zeolitically combined ammonium ions are evolved as ammonia and the finished hydrated silica-zirconia catalyst is obtained.

2. The silica-zirconia hydrogel is partially dried with or without the aid of a current of air at about 180° F. to any suitable water content such as 75%, 50% or 30%. Reducing the water content to less than 30% in some cases, results in a less efficient catalyst. The partially dried gel is washed with water and ammonium chloride solution as described in (1). The washed gel is broken into particles of any desired size and dried and heated at 1000° F. as described in (1).

3. If the catalyst is desired in a powder form or a pellet form, the gel is ground to a powder immediately after partial drying as described in (2) and then the powder is washed with water and ammonium chloride solution as described in (1). The washed powder is dried at 180° F. to 250° F. and pulverized again. This powder may be converted into pellets or it may be used in the powder form as a cracking catalyst. In either case, the silica-zirconia gel is heated at 1000° F. to remove the zeolitically combined ammonium ions and to further dry the catalyst before being used in a catalytic operation.

The above discussion refers to washing the material with an aqueous solution of an ammonium salt to substitute ammonium for sodium in the gel structure. Upon subsequent heating of the gel, ammonia is evolved as a gas, and a catalyst consisting essentially of silica and metal oxides, is obtained. Additional metal oxides may be incorporated in the catalyst by base-exchanging with a metal salt instead of the ammonium salts specified above. As is known to the prior art, those plural oxide compositions of either precipitated gel nature containing amphoteric oxides may be base-exchanged with aqueous salts of metals. The metal thus added may be the same or different from the original metal and may be either amphoteric, such as aluminum, or non-amphoteric, such as magnesium.

The above procedures are those commonly used in the art at the present time and are better suited for use in a showing of comparative results. It is to be understood, however, that the hydrogel is preferably formed in relatively small portions as described hereinabove and then washed and dried.

The composition of the silica-zirconia gel which yields the most efficient cracking catalyst depends upon the chemical and physical properties of the petroleum oil that is to be cracked. Generally, the ratio of silica to zirconia in the catalyst which is most efficient for the cracking of a gas oil, is not satisfactory for the cracking of heavy stocks which contain a large proportion of high-boiling hydrocarbons. Furthermore, for a given charge stock, the ratio of silica to zirconia yielding the most efficient catalyst is dependent upon the reagents used in preparing the hydrogel. For example, in cracking Oklahoma City gas oil over catalysts prepared from sodium silicate, zirconium sulfate and sulfuric acid, the best molecular ratios of silica to zirconia were found between 15.3 and 22.6.

For the polymerization of unsaturated hydrocarbons, the ratio of silica to zirconia in the catalyst is much higher than in a cracking catalyst.

Plural gels of silica zirconia with other oxides of the third and fourth groups of the periodic table are prepared by dissolving the salts of the corresponding oxides in an acid and mixing this acid solution with a solution of sodium silicate to produce a hydrogel under the conditions defined above. The salts of the elements of the third and fourth groups of the periodic table neutralize the alkali of the sodium silicate; since the quantity of these salts used, in general, in preparing the hydrogel is inadequate to neutralize all of the alkali, sufficient acid must be added so as to neutralize the excess alkali. An excess or an insufficient amount of acid may be used; however, this must be only under the conditions that a hydrogel is produced between a pH of 2.5 and 10 and preferably between pH 5 and 8.5.

The time of gelation, i. e., time required for the colloidal solution to set to a hydrogel, is dependent upon temperature, concentration of reactants and acidity. At a constant pH and fixed concentration of reactants, increasing the temperature of the reactant solutions decreases the time of gelation. At a constant pH and temperature, decreasing the concentration of the reactants by dilution with water increases the gelation time with increasing dilution. Thus, it is evident that more concentrated solutions may be employed in preparing the hydrogels if the reactant liquids are mixed at temperatures below that of room temperature. Increasing the pH by utilizing less acid, while the concentrations of the other reactants are maintained constant, results in a decrease in the time of gelation. Likewise, decreasing the pH by employing more acid increases the gelation time.

Example I

Three thousand, seven hundred and ten grams of "N" brand of sodium silicate (28.7% $SiO_2$, 8.9% $Na_2O$) were diluted to ten liters with distilled water and added to 6.7 liters of a well-agitated solution containing 384 grams of zirconium sulfate and 3.03 liters of 2.026 normal hydrochloric acid. A clear colloidal solution formed which had a pH of 6.0 and set to a gel 30 seconds after the sodium silicate solution was added. The hydrogel was broken into particles of about one inch in diameter and allowed to stand for thirty minutes in order to permit syneresis of the gel. The hydrogel was dried at 180° F. to a water content of 65% and then was washed with water until free of soluble salts. The salt-free gel was base-exchanged by washing four times with a 5% solution of ammonium chloride. Finally the gel was washed free of excess ammounium chloride, dried at 180° F. to constant weight, broken into fragmentary particles of the desired size and heat treated at 1100° F. for four hours before being tested as a cracking catalyst.

Example II

A solution of sodium silicate was prepared by diluting "N" brand sodium silicate (28.7% $SiO_2$, 8.9% $Na_2O$) so that it contained 106 grams of $SiO_2$ per liter. An acid solution was prepared so that it contained 108.7 cc. of 4.042 normal hydrochloric acid and 77.5 grams of zirconium sulfate per liter. These two solutions were mixed in the ratio of 250 cc. of the sodium silicate solution to 197.8 cc. of the acid solution. The resulting colloidal solution was ejected into the top of a column of mineral oil whose depth was nine feet. The globules of the colloidal solution fell through the oil and gelled before passing into the layer of water located beneath the oil. The hydrogel globules were conducted out of the bottom of the column in a stream of water and then washed with water until free of salts, base-exchanged with ammonium chloride and finally washed again to free them of excess ammonium chloride. The washed hydrogel was dried at 180° F. to constant weight. The drying was continued at a gradually increasing temperature up to 1100° F. at which temperature the gel pellets were maintained for four hours.

The time of gelation for the concentrations and proportion of reactants given above was about 40 seconds, while the pH was 6.4. The mineral oil used in the column had a specific gravity of 0.886 and a viscosity of 325 Saybolt seconds at 100° F.

Example III

The gel was prepared and processed as described in Example II.

An acid solution was prepared so that it contained 54.6 cc. of 4.042 normal hydrochloric acid, 41.7 grams of $Zr(SO_4)_2 \cdot 4H_2O$ and 56.2 grams $Th(NO_3)_4 \cdot 12H_2O$ per liter of solution. This solution was mixed with a sodium silicate solution having the same concentration as that of Example II in the ratio of 220 cc. of the acid solution to 200 cc. of the sodium silicate solution. The time of gelation for the concentrations and proportion of reactants used in this example was 20 seconds, while the pH was 6.3.

Example IV

Three thousand, seven hundred and ten grams of "N" brand of sodium silicate (28.7% $SiO_2$, 8.9% $Na_2O$) were diluted to ten liters with distilled water. While this solution was stirred by means of a mechanical device, 2.5 liters of a solution containing 94 grams of sodium aluminate were added to it. The resulting silicate solution was immediately added to 6.5 liters of a well-agitated acid solution containing 4.12 liters of 2.026 normal hydrochloric acid and 194 grams of $Zr(SO_4)_2 \cdot 4H_2O$. The pH of the resulting colloidal solution was 6.8. About 20 seconds after the silicate solution was added to the acid solution the whole volume of solution set to a gel. The hydrogel was dried at 180° F. to a water content of 65% and then it was washed and further processed as described in Example I.

Table 1 below shows the results of cracking Oklahoma City gas oil having an A. P. I. gravity of 35.8 and a boiling range from 471° to 708° F. over the catalysts prepared as described in the above examples. The oil was passed through the catalyst bed at 800° F. and at a liquid space velocity of 1.5 for 20 minutes on stream time.

Table 1

| Example | Catalyst | Percent weight of oil converted to coke | Percent weight of oil converted to gas | Percent volume of oil converted to gasoline |
|---|---|---|---|---|
| I | 10% $ZrO_2$, 90% $SiO_2$ | 2.5 | 5.5 | 44 |
| II | 15% $ZrO_2$, 85% $SiO_2$ | 5.1 | 9.1 | 53 |
| III | 10% $ZrO_2$, 15% $ThO_2$, 75% $SiO_2$ | 4.0 | 7.8 | 50 |
| IV | 5% $ZrO_2$, 5% $Al_2O_3$, 90% $SiO_2$ | 4.0 | 9.3 | 49 |

Catalysts comprising silica and zirconia, formed by one of the methods noted above as utilized in the prior art have been heretofore suggested as catalysts for the cracking of hydrocarbon oils. Such catalysts have not been found satisfactory and, so far as is known, no commercial use has been made of silica zirconia catalysts. It may be stated in general that, other things being equal, a better catalyst results if the silica and zirconia or other metal oxides are formed jointly as compared with mixing of preformed oxides or impregnation of silica gels and precipitates with metal salts which can be converted to the oxide. Fragments of gels and precipitates are not particularly suitable because the breaking up of the gel leaves fragments with sharp corners and fractures which ultimately lead to channeling of catalytic masses and undue formation of fines in use. This is particularly true when the catalyst is employed in a continuous cracking system wherein the catalyst passes in a cyclic manner through conversion and regeneration stages.

Silica-zirconia is not adapted to formation of pellets by molding and extrusion processes which have been used with silica-alumina precipitates and mixed precipitates and gels. Silica-zirconia compositions formed into pellets by conventional means are extremely soft and are not suitable for commercial usage.

The strength of individual pellets, as measured by placing a single pellet on a hard smooth steel surface and applying force directly to the upper surface of the pellet until it crushes, reveal that the hardest pellets formed by molding silica-zirconia compositions have individual pellet strengths of not more than two pounds. This is in marked contrast to the strength of the pellets formed by the method of this invention, whereby gel pellets are obtained which will support over fifty pounds individually. Normal pellets prepared as described will have individual pellet strengths ranging from 100 to 350 pounds.

In the present process of forming plural oxide gels having smooth, hard surfaces when dried, it is necessary that certain size limitations be observed in order to obtain the benefits of the preferred embodiments of the invention employing pellets having surfaces formed at gelation. If pellets are formed, as by dropping a sol onto a surface which is not wetted thereby, or by injection of the sol into a column of oil, conditions should be so regulated that substantially all the portions are of a size having no dimension greater than about 25 mm. at the time of gelation.

Objects of the invention may also be realized by forming the pellets in accordance with the process disclosed in application Serial No. 505,582, filed October 8, 1943, by Peter D. Valas and Ernest A. Bodkin. According to that process, the sol is poured into a suitable mold which may be spherical or cylindrical or any other desired shape and retained in the mold until gelation is complete. Where it is desired to form particles of gel having one long dimension, i. e., rods, the other two dimensions of the rod should be not greater than that stated above. In other words, no matter what process of formation is used, the hydrogel particle at the time of gelation should have two dimensions at right angles to each other—neither of which exceeds about 25 mm. The two dimensions of limited length will, of course, be at right angles to the length of the particle and the limitation applies throughout the length of the particle.

I claim:

1. In a process of converting hydrocarbons, the process which comprises contacting said hydrocarbons at conversion temperature with a catalyst prepared by forming a homogeneous colloidal solution having a pH of from 2.5 to 10 comprising silicic acid by efficiently mixing together an aqueous solution of an alkali metal silicate and an aqueous acid solution, one of said aqueous solutions containing a water soluble zirconium compound and the said colloidal solution being characterized by an inherent capacity to set to a hydrogel upon the lapse of a suitable period of time without addition to or subtraction from said gel of any substance, admitting said sol in the form of separate globules to a body of oil in which said globules assume spheroidal shape having a diameter not substantially greater than 25 mm. due to surface tension at the interface between said sol and said oil, retaining said spheroidal globules in said oil until gelation occurs thus forming spheroids of hydrogel, effecting retention in said sol of substantially all the constituents of said sol until gelation occurs, washing the hydrogel spheroids with water, base exchanging the washed spheroids to remove alkali metals therefrom and drying the hydrogel spheroids.

2. In a process of converting hydrocarbons, the process which comprises contacting said hydrocarbons at conversion temperature with a catalyst prepared by forming a homogeneous colloidal solution having a pH of from 5 to 8.5 comprising silicic acid by efficiently mixing together an aqueous solution of an alkali metal silicate and an aqueous acid solution, one of said aqueous solutions containing a water soluble zirconium compound and the said colloidal solution being characterized by an inherent capacity to set to a hydrogel upon the lapse of a suitable period of time without addition to or subtraction from said gel of any substance, admitting said sol in the form of separate globules to a body of oil in which said globules assume spheroidal shape having a diameter not substantially greater than 25 mm. due to surface tension at the interface between said sol and said oil, retaining said spheroidal globules in said oil until gelation occurs thus forming spheroids of hydrogel, effecting retention in said sol of substantially all the constituents of said sol until gelation occurs, washing the hydrogel spheroids with water, base exchanging the washed spheroids to remove alkali metals therefrom and drying the hydrogel spheroids.

MILTON M. MARISIC.